United States Patent
Ide et al.

(10) Patent No.: US 7,092,613 B1
(45) Date of Patent: Aug. 15, 2006

(54) BACKUP DEVICE IN CASE OF POWER FAILURE IN IMAGE RECORDING APPARATUS

(75) Inventors: Kouki Ide, Kyoto (JP); Yoshiaki Maida, Shijyonawate (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/539,521

(22) Filed: Mar. 30, 2000

(30) Foreign Application Priority Data

Mar. 31, 1999 (JP) .......................... 11-092535

(51) Int. Cl.
*H04N 5/76* (2006.01)
*H04N 5/225* (2006.01)

(52) U.S. Cl. .............. 386/46; 386/117; 348/333.13; 348/372

(58) Field of Classification Search ............ 386/46, 386/1, 33, 27, 40, 36, 109, 111, 112, 117, 386/122, 123, 124, 125, 126; 348/333.13, 348/372; 358/906, 909.1; H04N 5/76, 5/225, H04N 9/79
See application file for complete search history.

(56) References Cited

U.S. PATENT DOCUMENTS

| | | | | |
|---|---|---|---|---|
| 5,710,597 A | * | 1/1998 | Tamaki et al. | 348/372 |
| 5,950,013 A | * | 9/1999 | Yoshimura et al. | 710/5 |
| 6,002,436 A | * | 12/1999 | Anderson | 348/372 |
| 6,233,016 B1 | * | 5/2001 | Anderson et al. | 348/372 |

FOREIGN PATENT DOCUMENTS

| JP | 55-032265 | 3/1980 |
|---|---|---|
| JP | 10-177669 | 6/1998 |

* cited by examiner

*Primary Examiner*—Thai Tran

(57) ABSTRACT

A backup device in case of power failure comprises a device for continuing, when power failure is detected by a power failure detecting circuit during a recording operation, the recording operation by turning a switch on, and a device for turning the switch off when data which have been stored in both memories immediately before power fails and all data composing two blocks to which the data belong have been recorded on a recording medium, to stop the recording operation.

2 Claims, 12 Drawing Sheets

FIG. 7

| INDEX | ADDRESS IN WHICH FRAME HEADER IS STORED |
|---|---|
| 1 | xxxxh |
| 2 | xxxxh |
| 3 | xxxxh |
| 4 | xxxxh |
|  | xxxxh |
|  | xxxxh |
|  | xxxxh |
|  | xxxxh |
|  | xxxxh |
|  | xxxxh |
| 2024 | xxxxh |

FIG. 9

| INDEX NUMBER IN SUB-BANK | STORED DATA |
|---|---|
| 1 | I1 |
| 2 | P11 |
| 3 | P12 |
| 4 | P13 |
| 5 | I2 |
| 6 | P21 |
| 7 | P22 |
| 8 | P23 |
| 9 | I3 |
| 10 | P31 |
| 11 | P32 |
| 12 | P33 |

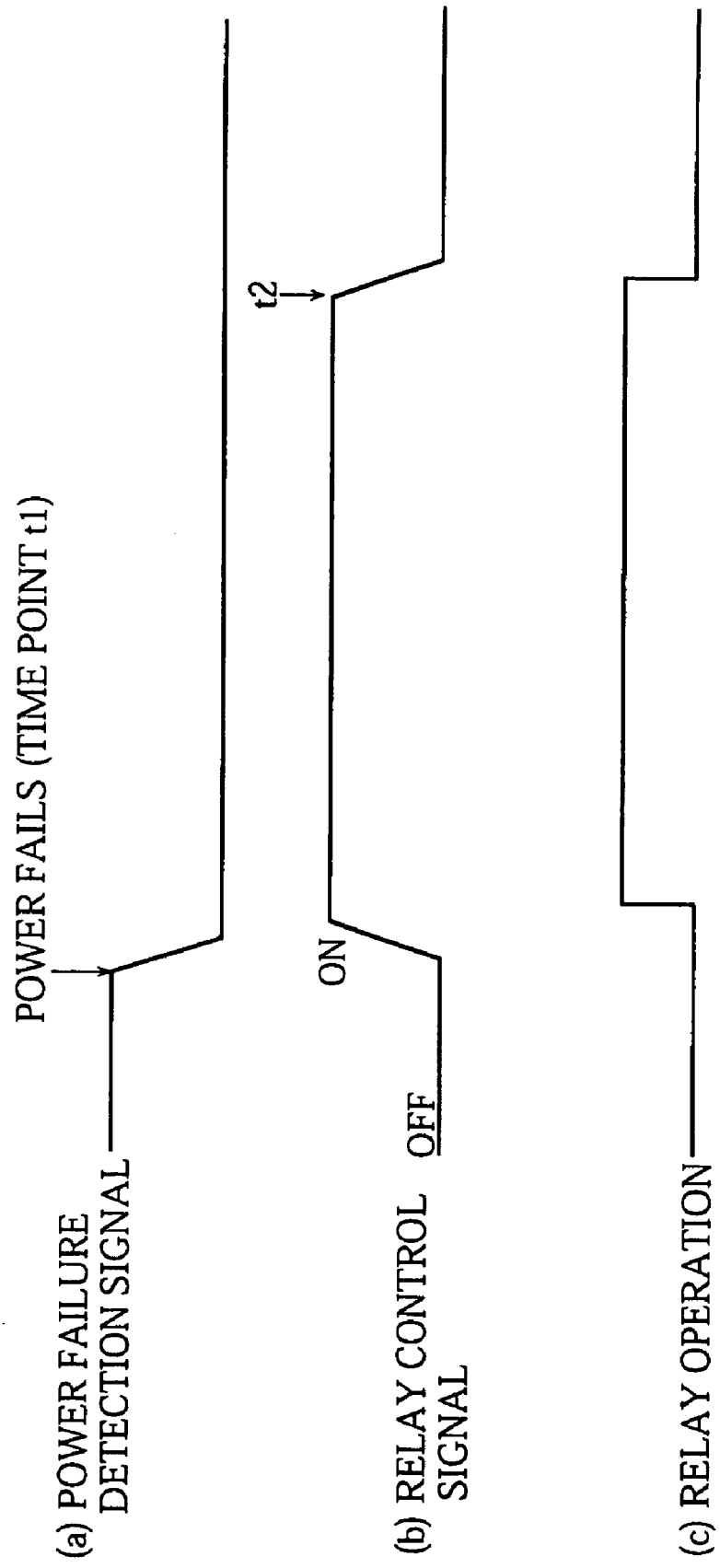

BACKUP DEVICE IN CASE OF POWER FAILURE IN IMAGE RECORDING APPARATUS

BACKGROUND OF THE INVENTION

1. Field of the Invention

The present invention relates to a backup device in case of power failure in an image recording apparatus.

2. Description of the Prior Art

An image recording apparatus for alternately writing an image picked up by a monitoring camera or its compressed data in two memories for each block, reading out, every time data corresponding to one block are written into the memory, the data from the memory into which the data corresponding to one block have been written, and recording the data read out on a recording medium has already been developed.

In such an image recording apparatus, when power fails during a recording operation, the data which have been stored in both the memories immediately before power fails are lost.

SUMMARY OF THE INVENTION

An object of the present invention is to provide a backup device in case of power failure in an image recording apparatus capable of continuing, when power fails during a recording operation, the recording operation until all data stored in both memories immediately before power fails and all data composing two blocks to which the data belong are recorded on a video tape.

A backup device in case of power failure in an image recording apparatus according to the present invention is a backup device in case of power failure in an image recording apparatus for alternately writing input image data or its compressed data in two memories for each block including data corresponding to a plurality of fields, reading out, every time data corresponding to one block are written into the memory, the data from the memory into which the data corresponding to one block have been written, and recording the data read out on a recording medium, characterized by comprising a backup power supply in case of power failure; a power failure detecting circuit for detecting that power fails; a power supply circuit connected to the backup power supply through switching means and supplying power to a portion required to continue at least a recording operation on the basis of the backup power supply; means for continuing, when the power failure is detected by the power failure detecting circuit during the recording operation, the recording operation by turning switching means on; and means for turning the switching means off when the data which have been stored in both the memories immediately before power fails and all the data composing the two blocks to which the data belong have been recorded on the recording medium, to stop the recording operation.

It is preferable that the backup power supply is a battery, and the backup device further comprises a charging circuit for charging the battery on the basis of a commercial power supply when the power to the image recording apparatus is turned on.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a schematic view showing the contents of a sub-bank;

FIG. 9 is a schematic view showing data which have already been normally reproduced out of data corresponding to a block which have been normally reproduced immediately before the time point where a reverse play command is entered and index numbers corresponding thereto;

FIG. 12 is a timing chart showing the operation at the time of power failure of the power supply circuit shown in FIG. 11.

DETAILED DESCRIPTION OF THE PREFERRED EMBODIMENTS

Figure 1:
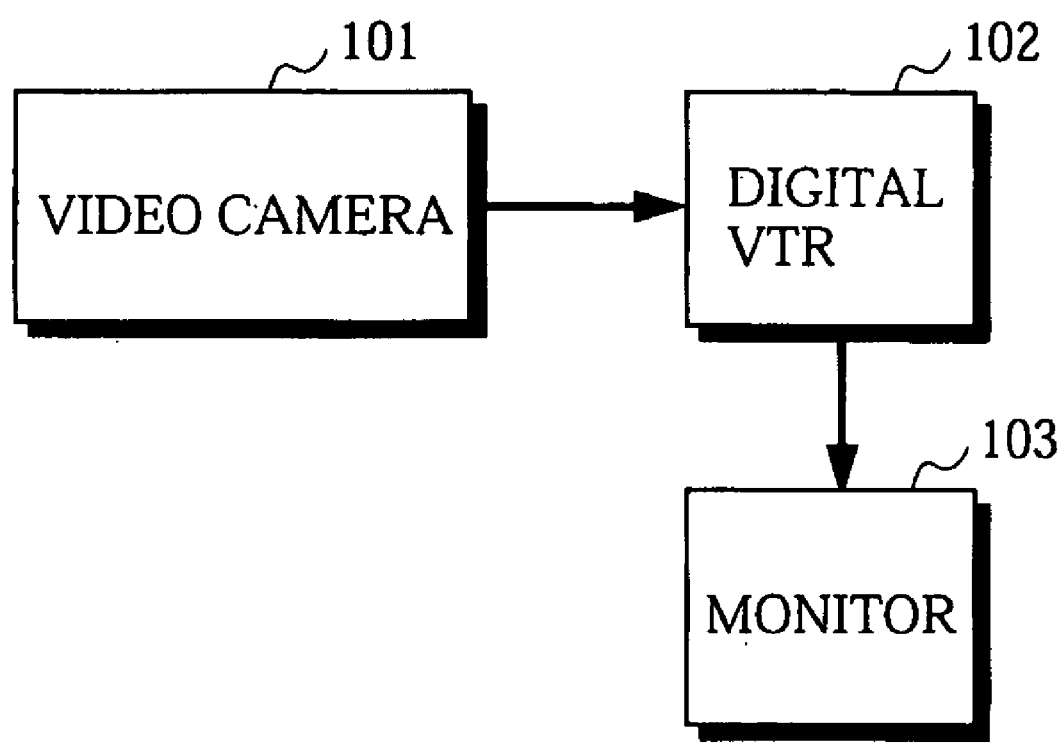
FIG. 1 is a block diagram showing the configuration of a monitoring system.

Referring now to the drawings, description is made of an embodiment in a case where the present invention is applied to a digital VTR for recording and reproducing an image picked up by a monitoring camera.

[1] Description of Overall Configuration of Monitoring System

FIG. 1 illustrates the overall configuration of a monitoring system.

The monitoring system comprises a video camera (hereinafter referred to as a monitoring camera) 101, a digital VTR 102 for compressing and recording an image signal obtained by the monitoring camera 101, and a monitor 103 for displaying an image reproduced by the digital VTR 102.

Figure 2:
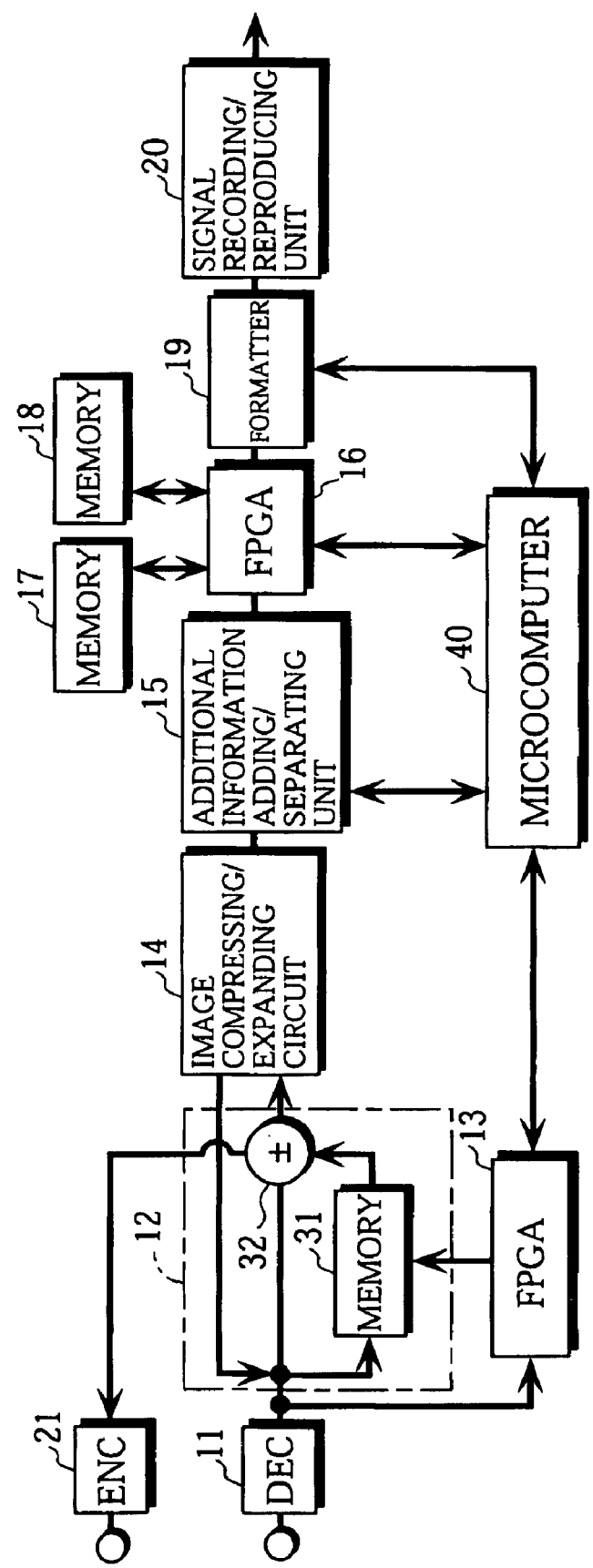
FIG. 2 is a block diagram showing the schematic configuration of a digital VTR.

[2] Description of Operation at the Time of Recording of Image Signal Processing Circuit in Digital VTR 102 FIG. 2 illustrates the configuration of an image signal processing circuit in the digital VTR 102. Description is made of the operation at the time of recording of the image signal processing circuit.

At the time of recording, an analog image signal fed from the monitoring camera 101 is converted into digital image data by a decoder 11. The image data obtained by the decoder 11 is fed to a difference block 12. The difference block 12 comprises a memory 31 and addition/subtraction means 32. The memory 31 is controlled by a first FPGA (Field Programmable Gate Array) 13.

Figure 3:
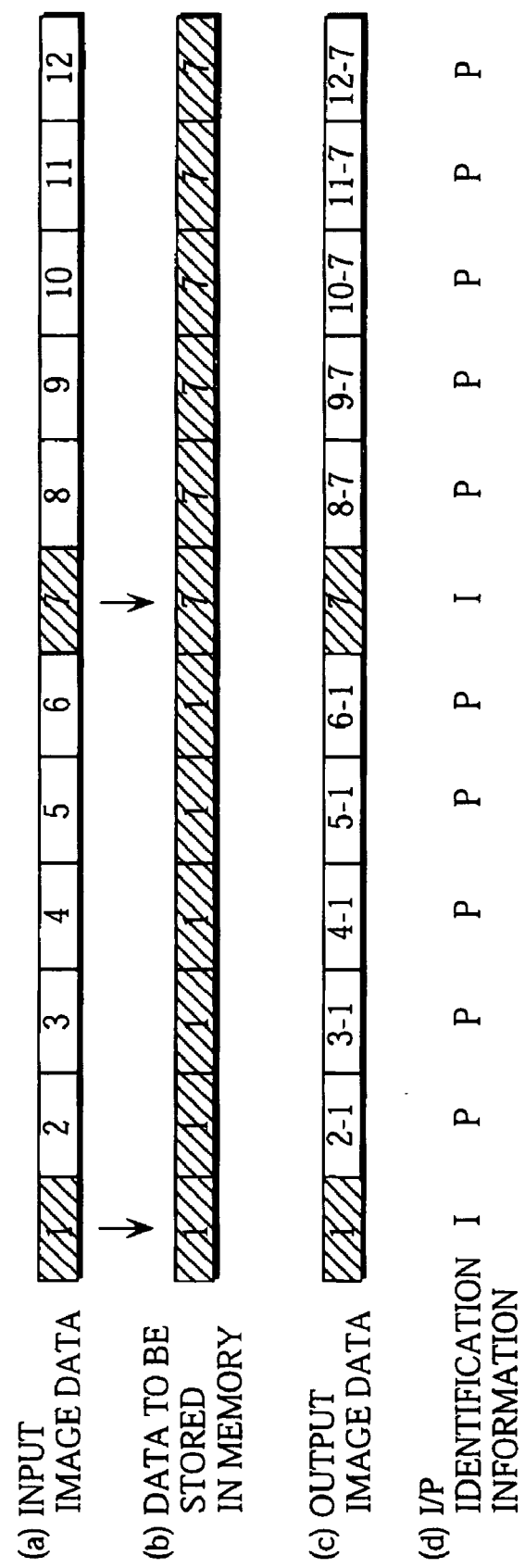
FIG. 3 is a timing chart showing the operation at the time of recording of a difference block.

FIG. 3 illustrates the operation at the time of recording of the difference block 12. In FIG. 3, a reference numeral denotes a field number.

The first FPGA 13 stores the image data outputted from the decoder 11 as basic image data in the memory 31 in a period of a predetermined number of fields (in this example, in a period of six vertical periods), and feeds the image data to an image compressing/expanding circuit 14 through the addition/subtraction means 32.

Each of the image data corresponding to the fields between the field corresponding to the image data which has been stored in the memory 31 and the field corresponding to the image data which is to be subsequently stored in the memory 31 is fed to the addition/subtraction means 32, the difference between the fed image data and the basic image data which is stored in the memory 31 is found, and data representing the found difference is fed to the image compressing/expanding circuit 14.

In the example shown in FIG. 3, image data "1" and "7" corresponding to field numbers "1" and "7" are stored in the memory 31, and are fed to the image compressing/expanding circuit 14. Each of image data "2" to "6" corresponding to field numbers between the field numbers "1" and "7" is fed to the addition/subtraction means 32, the difference between the fed image data and the basic image data "1" which is stored in the memory 31 is found, and data representing the found difference is fed to the image compressing/expanding circuit 14. Image data (basic image data) which has been fed to the image compressing/expanding circuit 14 through the addition/subtraction means 32 is called I image data, and data (difference data) which has been fed to the image compressing/expanding circuit 14 after the difference thereof from the basic image data was found by the addition/subtraction means 32 is called P image data.

In the image compressing/expanding circuit 14, the image data fed from the difference block 12 is compressed by a JPEG (Joint Photographic Experts Group) system, for example, for each field. Compressed image data (coded data) obtained by the image compressing/expanding circuit 14 is fed to additional information adding/separating unit 15.

On the other hand, a microcomputer 40 acquires, from the first FPGA 13, I/P identification information indicating whether the compressed image data fed to the additional information adding/separating unit 15 corresponds to an I image or a P image, and feeds the acquired I/P identification information, together with recording time information (information relating to the current year, month, day, minute, and second) and the like, to the additional information adding/separating unit 15.

In the additional information adding/separating unit 15, additional information such as the I/P identification information and the recording time information which corresponds to the compressed image data fed from the microcomputer 40 is added to the compressed image data obtained by the image compressing/expanding circuit 14. The data to which predetermined data has been added by the additional information adding/separating unit 15 is fed to a second FPGA 16.

The second FPGA 16 alternately writes the data fed from the additional information adding/separating unit 15 in two memories 17 and 18 for each predetermined block including data corresponding to a plurality of fields, reads out, every time data corresponding to one block are written into the memory, the data from the memory into which the data corresponding to one block have been written, and feeds the data read out to a formatter 19. One block is composed of data corresponding to 288 tracks, including information relating to an audio in this example.

Specifically, the second FPGA 16 writes the data fed from the additional information adding/separating unit 15 into one of the memories, for example, the first memory 17. When the data corresponding to one block have been written into the first memory 17, the memory into which the data are to be written is switched to the other second memory 18 and at the same time, the reading of the data from the first memory 17 is started.

The data read out of the first memory 17 is fed to the formatter 19. When the data corresponding to one block have been read out of the first memory 17, the reading is stopped.

Thereafter, when the data corresponding to one block have been written into the second memory 18, the memory into which the data are to be written is switched to the first memory 17 and at the same time, the reading of the data from the second memory 18 is started. The data read out of the second memory 18 is fed to the formatter 19. When the data corresponding to one block have been read out of the second memory 18, the reading is stopped. Thereafter, the same processing is repeated.

In the formatter 19, the fed data is converted into data having a data structure which can be recorded on a video tape. The data obtained by the formatter 19 is recorded on the video tape through a recording amplifier and a video head inside a signal recording/reproducing unit 20. That is, image data are recorded basically for each block (corresponding to 288 tracks) on the video tape. Every time the recording of the data for each block is terminated, the video tape is stopped.

The second FPGA 16 and the formatter 19 are controlled by the microcomputer 40.

Figure 4:
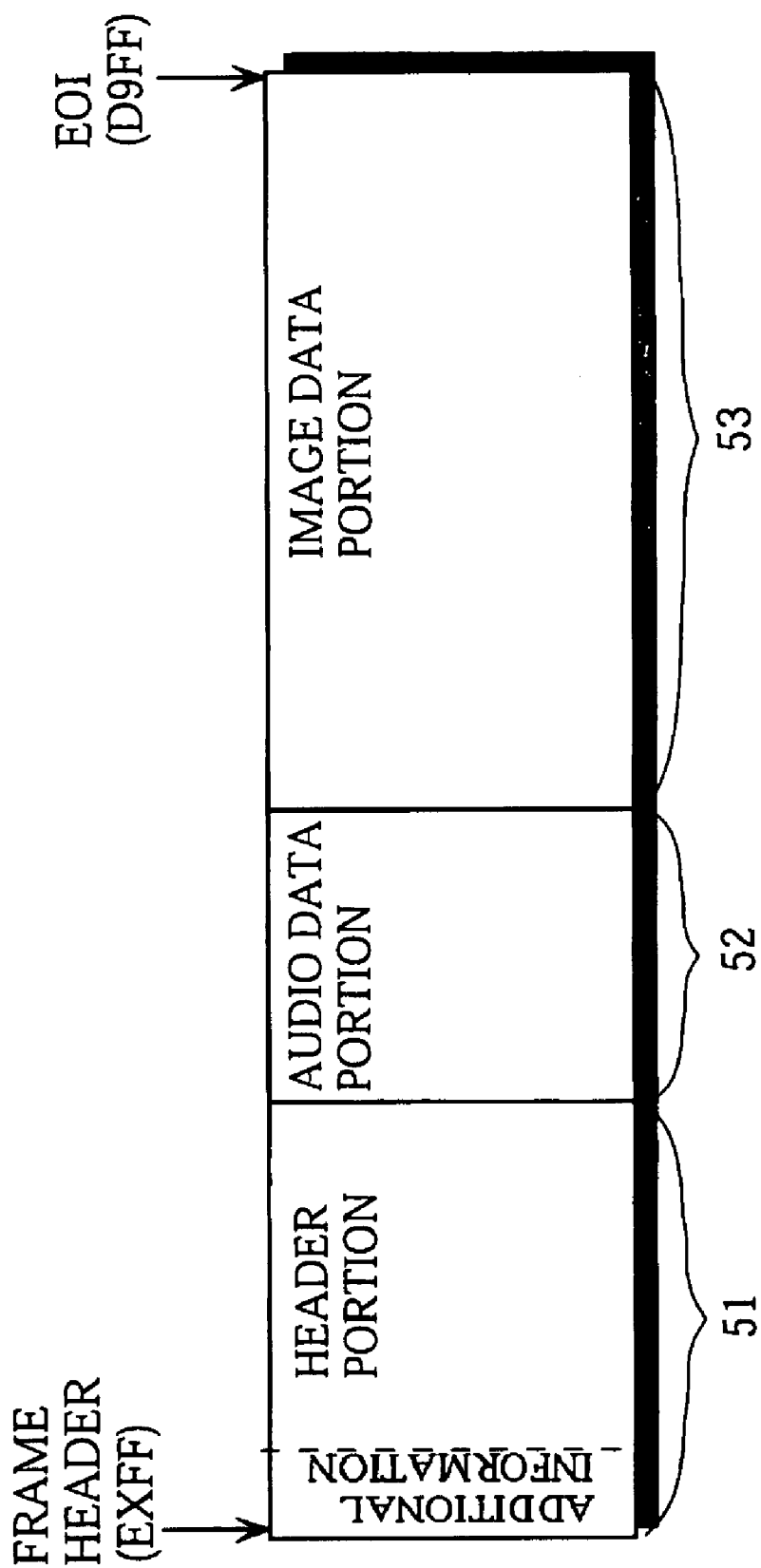
FIG. 4 is a schematic view showing a format for data corresponding to one field which is recorded on a video tape.

FIG. 4 illustrates a format for data corresponding to one field which is recorded on the video tape.

A data block corresponding to one field comprises a header portion 51, an audio data portion 52, and an image data portion 53.

The header portion 51 includes additional information such as I/P identification information and recording time information (year, month, day, hour, minute, and second), a quantization table (Q table), voice added data, and so forth. An example of the I/P identification information is "EXFFh", which is inserted as a frame header into the head of the header portion 51. "h" in "EXFFh" indicates that "EXFF" is a hexadecimal number. An image in the image data portion 53 is an I image if "X" in "EXFF" is zero, while being a P image if it is one. An end code (EOI; for example, "D9FFh") indicating the end of the image data portion 53 is inserted into the end of the image data portion 53.

[3] Description of Video Head Clogging Check Performed at the Time of Recording

As described above, at the time of recording, every time data corresponding to one block are written into the video tape, the video tape is stopped. However, a video head clogging check is performed utilizing a time period during which the video tape is stopped. Description is now made of a case where two video heads are provided opposite to each other through an angle of 180° in a recording drum.

Figure 5:
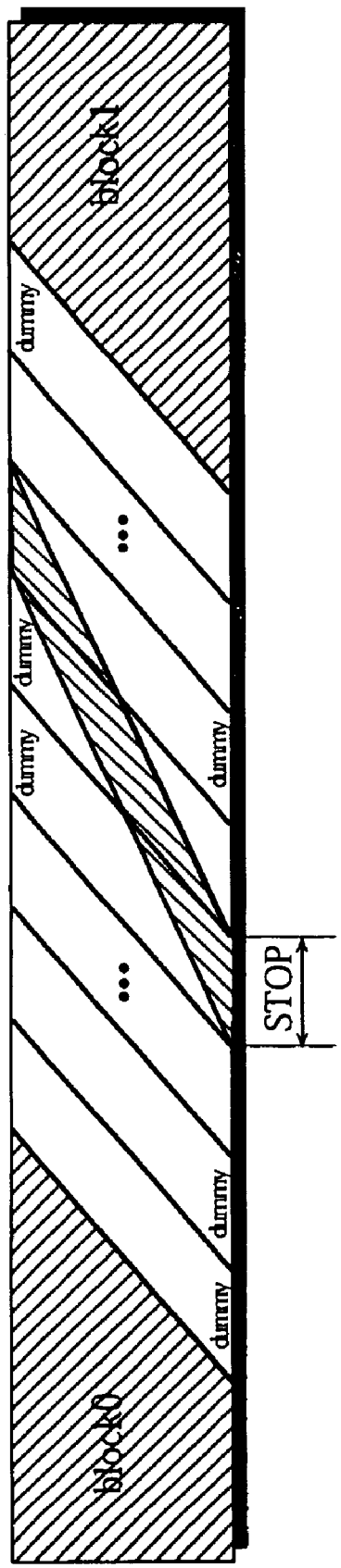
FIG. 5 is a schematic view showing the timing of performing a head clogging check.

As shown in FIG. 5, when data corresponding to one block (data corresponding to block0 in FIG. 5) are recorded on the video tape, dummy data corresponding to six tracks are recorded, and the video tape is then stopped. A check for clogging of each of the video heads is performed in the stopped state. When the clogging check is terminated, the video tape is caused to wait, allowing slight slack, by rotating a capstan in the opposite direction by only a predetermined amount in order to prevent the video tape from being damaged. Thereafter, at the timing of recording data corresponding to the subsequent block (data corresponding to block1 in FIG. 5), dummy data corresponding to a predetermined number of tracks are first recorded, and the recording of the data corresponding to the subsequent block on the video tape is then started.

Figure 6:
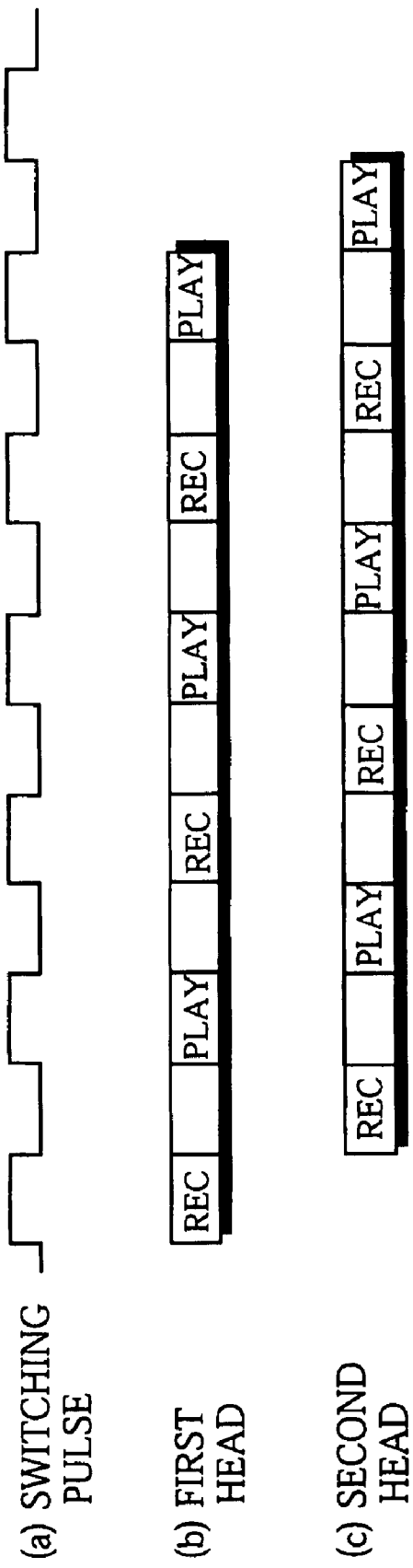
FIG. 6 is a timing chart for explaining a head clogging check performed when a video tape is stopped.

The check for clogging of each of the video heads is performed in the following manner. As shown in FIG. 6, recording and play of a test pattern are performed three times per head in a state where the video tape is stopped. The recording timing and the play timing of the test pattern for each of the video heads are controlled on the basis of a switching pulse, as shown in FIG. 6.

The microcomputer 40 calculates the sum of head outputs at the time of play performed three times for each of the video heads, and judges, when the sum is not more than a predetermined value (for example, not more than one-fourth a normal value), that the video head is clogged. The microcomputer 40 stops, when it judges that either one of the video heads is clogged, recording, and reports that the recording is stopped.

[4] Description of Operation at the Time of Play of Image Signal Processing Circuit At the time of play, data are read for each block from the video tape by the video head inside the signal recording/reproducing unit 20. The read image data are fed to the second FPGA 16 through a reproducing amplifier inside the signal recording/reproducing unit 20 and the formatter 19.

The second FPGA 16 alternately writes the fed data into the two memories 17 and 18 for each block, reads out, every time the data corresponding to one block are written into the memory, the data from the memory into which the data corresponding to one block have been written, and feeds the data read out to the additional information adding/separating unit 15.

The second FPGA 16 produces, when it writes the data fed from the formatter 19 into the memories 17 and 18, a sub-bank representing an address in which a frame header at the head of data corresponding to each field is stored is prepared in the memory, as shown in FIG. 7, such that a data write address can be recognized for the field.

In the additional information adding/separating unit 15, the additional information such as I/P identification information and time information is separated from the fed data corresponding to one field. The data from which the additional information has been separated is fed to the first FPGA 13 through the microcomputer 40.

The data from which predetermined data has been separated by the additional information adding/separating unit 15 is expanded for each field upon being fed to the image compressing/expanding circuit 14. Image data obtained by the image compressing/expanding circuit 14 is fed to the difference block 12.

Figure 8:
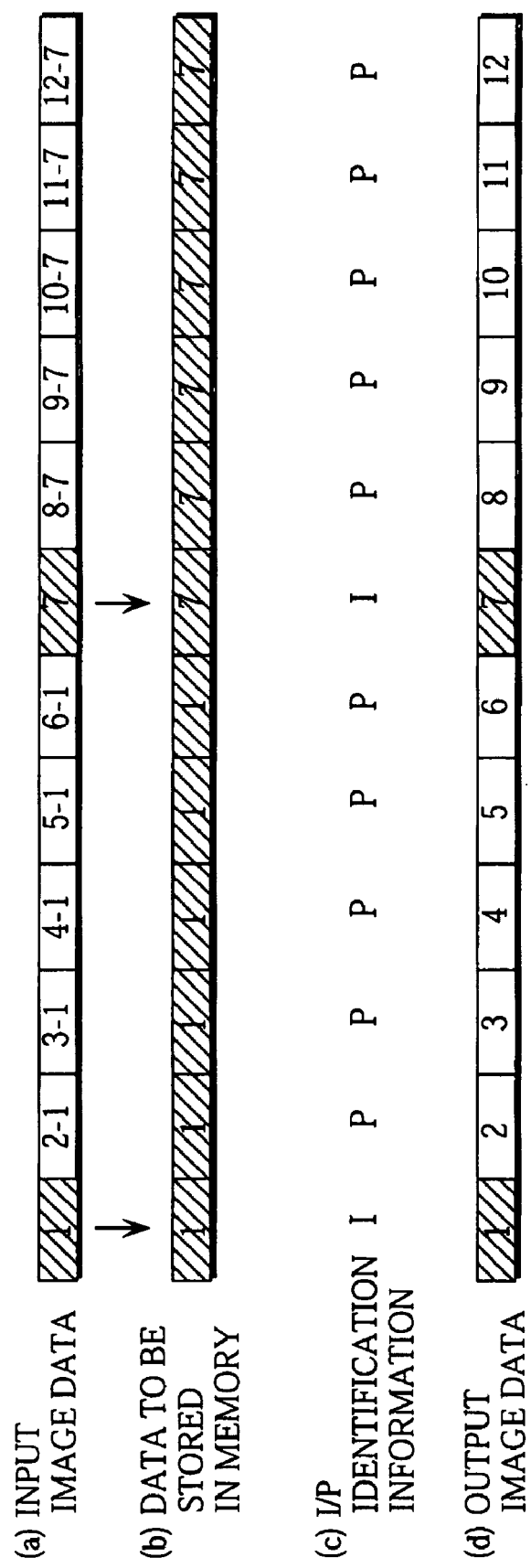
FIG. 8 is a timing chart showing the operation at the time of play of the difference block.

FIG. 8 illustrates the operation at the time of play of the difference block 12.

The first FPGA 13 judges whether an image inputted to the difference block 12 is an I image or a P image on the basis of the I/P identification information fed from the microcomputer 40.

When the image inputted to the difference block 12 is the I image, image data representing the I image is stored in the memory 31, and is fed to an encoder 21 through the addition/subtraction means 32. When the image inputted to the difference block 12 is the P image, data representing the P image (difference data) is fed to the addition/subtraction means 32, to find the sum of the P image data and the I image data (basic image data) which has been most newly stored in the memory 31. Obtained image data is fed to the encoder 21.

In the example shown in FIG. 8, I image data "1" and "7" are stored in the memory 31, and are fed to the encoder 21. Further, each of P image data "2-1", "3-1", "6-1", "8-7", etc. is added to the I image data which has been most newly stored in the memory 31, to be returned to its original image data. Thereafter, the original image data is then fed to the encoder 21.

In the encoder 21, the fed image data is returned to an analog image signal, and the analog image signal is then fed to the monitor 103.

[5] Description of Special Play

[5-1] Description of Operations at the Time of Reverse Play

Description is made of operations in a case where a reverse play command is entered into the microcomputer 40 while normal play is being performed.

In the following description, an I/P group shall refer to a group comprising an arbitrary I image and P images whose difference from the I image is found.

At the time point where the reverse play command is entered into the microcomputer 40, data corresponding to one block (288 tracks) which have been normally reproduced immediately before the time point are stored in the first memory 17 or the second memory 18. The I image in the I/P group which has been reproduced immediately before the time point where the reverse play command is entered into the microcomputer 40 is stored in the memory 31 in the difference block 12.

For convenience of illustration, it is assumed that at the time point where the data corresponding to 12 fields corresponding to the index numbers 1 to 12 in the sub-bank (see FIG. 7) are normally reproduced, as shown in FIG. 9, out of the data corresponding to one block stored in the first memory 17, the reverse play command is entered into the microcomputer 40. In FIG. 9, I indicates an I image, and P indicates a P image. I1 and P11, P12 and P13 constitute the same I/P group, I2 and P21, P22 and P23 constitute the same I/P group, and I3 and P31, P32 and P33 constitute the same I/P group.

At the time of reverse play, the data corresponding to the index numbers 12, 11, 10, . . . 2, 1 must be reproduced in this order. In each of the I/P groups, however, the P image cannot be reproduced unless the I image is previously reproduced. At the time of reverse play, the second FPGA 16, the microcomputer 40, and the first FPGA 13 carry out the following control.

① The I/P group (I3, P31, P32, P33) which should be first reproduced is first reproduced by reverse play. Specifically, when the reverse play command is entered, the I image (I3) corresponding to the index number 9 is stored in the memory 31 in the difference block 12. Accordingly, the P images P33, P32, and P31 are reproduced in this order on the basis of the data I3 stored in the memory 31. Thereafter, the I image I3 is reproduced. Consequently, the image data corresponding to the index numbers 12 to 9 are reproduced in the opposite direction.

② Only respective additional information in the image data corresponding to the index numbers 8 to 5 are reproduced in the order of decreasing number, to acquire the index number 5 corresponding to the I image I2 in the I/P group (I2, P21, P22, P23) which should be subsequently reproduced on the basis of I/P identification information included in the additional information.

③ The I image (I2) corresponding to the index number 5 is reproduced. Consequently, the reproduced I image (I2) is stored in the memory 31 in the difference block 12. However, the reproduced I image is controlled so as not to be outputted from the difference block 12.

④ The I/P group (I2, P21, P22, P23) composed of the image data corresponding to the index numbers 5 to 8 is reproduced by reverse play, as in the item ①. ⑤ Only respective additional information in the image data corresponding to the index numbers 4 to 1 are reproduced in the order of decreasing number, to acquire the index number 1 corresponding to the I image I1 in the I/P group (I1, P11, P12, P13) which should be subsequently reproduced on the basis of I/P identification information included in the additional information.

⑥ The I image (I1) corresponding to the index number 1 is reproduced. Consequently, the reproduced I image (I1) is stored in the memory 31 in the difference block 12. However, the reproduced I image is controlled so as not to be outputted from the difference block 12.

⑦ The 1/P group (I1, P11, P12, P13) composed of the image data corresponding to the index numbers 1 to 4 is reproduced by reverse play, as in the item ①. In the above-mentioned manner, the data which has been normally reproduced at the time point where the reverse play command is entered into the microcomputer 40 and the preceding data out of the data corresponding to one block which have been normally reproduced at the time point where the reverse play command is entered into the microcomputer 40 are reproduced in the opposite direction.

At the time of reverse play, the data are read for each block in the order reverse to the order recorded, contrary to that at the time of normal play. When data in a block preceding the block including the data which have been reproduced in the opposite direction in the above-mentioned manner are stored in the memory different from the memory in which the data which have been reproduced in the opposite direction are stored out of the memories 17 and 18, the data in the block are reproduced in the opposite direction by the same processing as the processing in the item ② and the subsequent items.

[5-2] Description of Operations at the Time of Forward Play

At the time of forward play, data read from the video tape are alternately stored for each block in the memories 17 and 18, as at the time of normal play. At the time of forward play, however, only data corresponding to the I image out of the data stored in the memories 17 and 18 are read out and are reproduced.

[5-3] Description of Operations at the Time of Rewind Play

At the time of rewind play, data read out of the video tape are alternately stored for each block in the memories 17 and 18, as at the time of reverse play. At the time of rewind play, however, only data corresponding to the I image out of the data stored in the memories 17 and 18 are read out in the opposite direction and are reproduced.

[6] Description of Backup Function in Case of Power Failure

As described in the foregoing, at the time of a recording operation, data are recorded on the video tape for each block.

Figure 10:
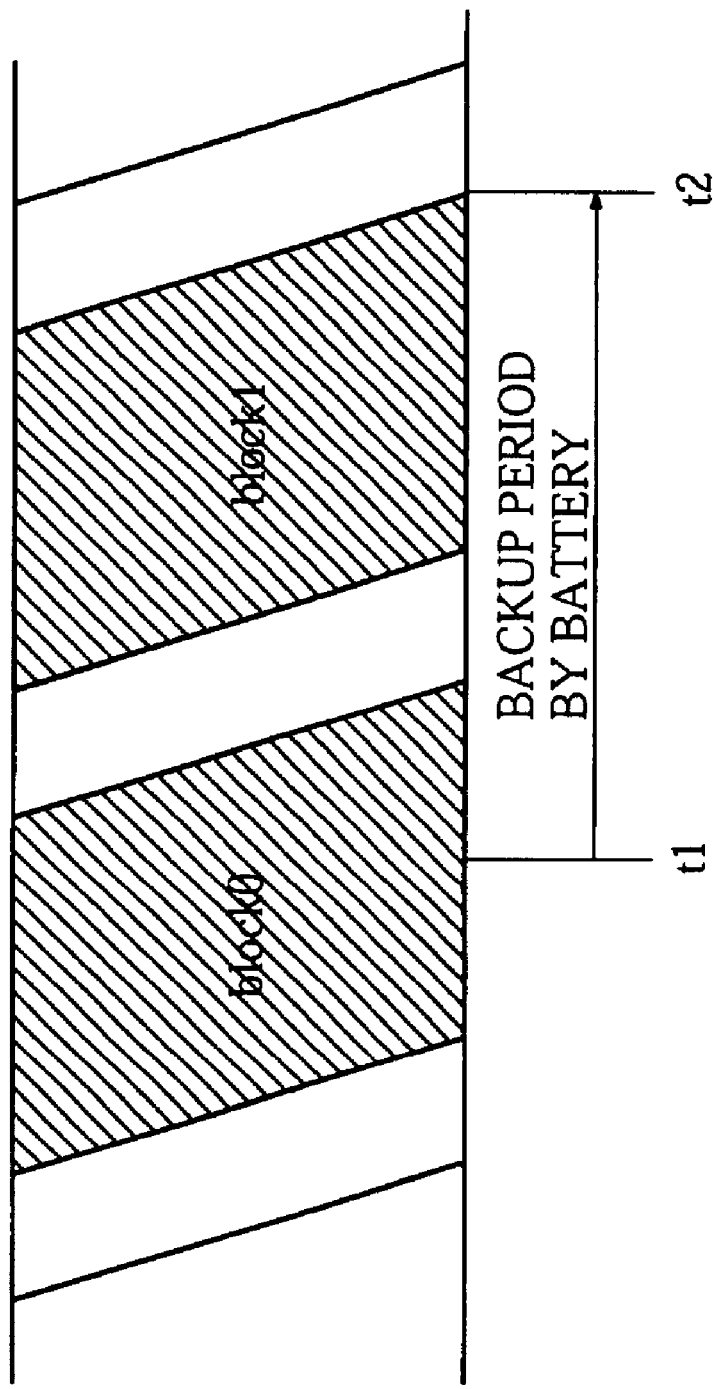
FIG. 10 is a schematic view for explaining a backup function in case of power failure.

As shown in FIG. 10, when power fails at the time point t1 during recording of data corresponding to block0, data which have been stored in the memories 17 and 18 immediately before power fails are lost.

When it is assumed that the data corresponding to block0 are read out of the memory 17 immediately before the time point t1, parts of data corresponding to block1 are stored in the memory 18 immediately before the time point t1. The digital VTR has a backup function for continuing a recording operation by a battery until all the data corresponding to block0 and all the data corresponding to block1 are recorded on the video tape in such a case.

Figure 11:
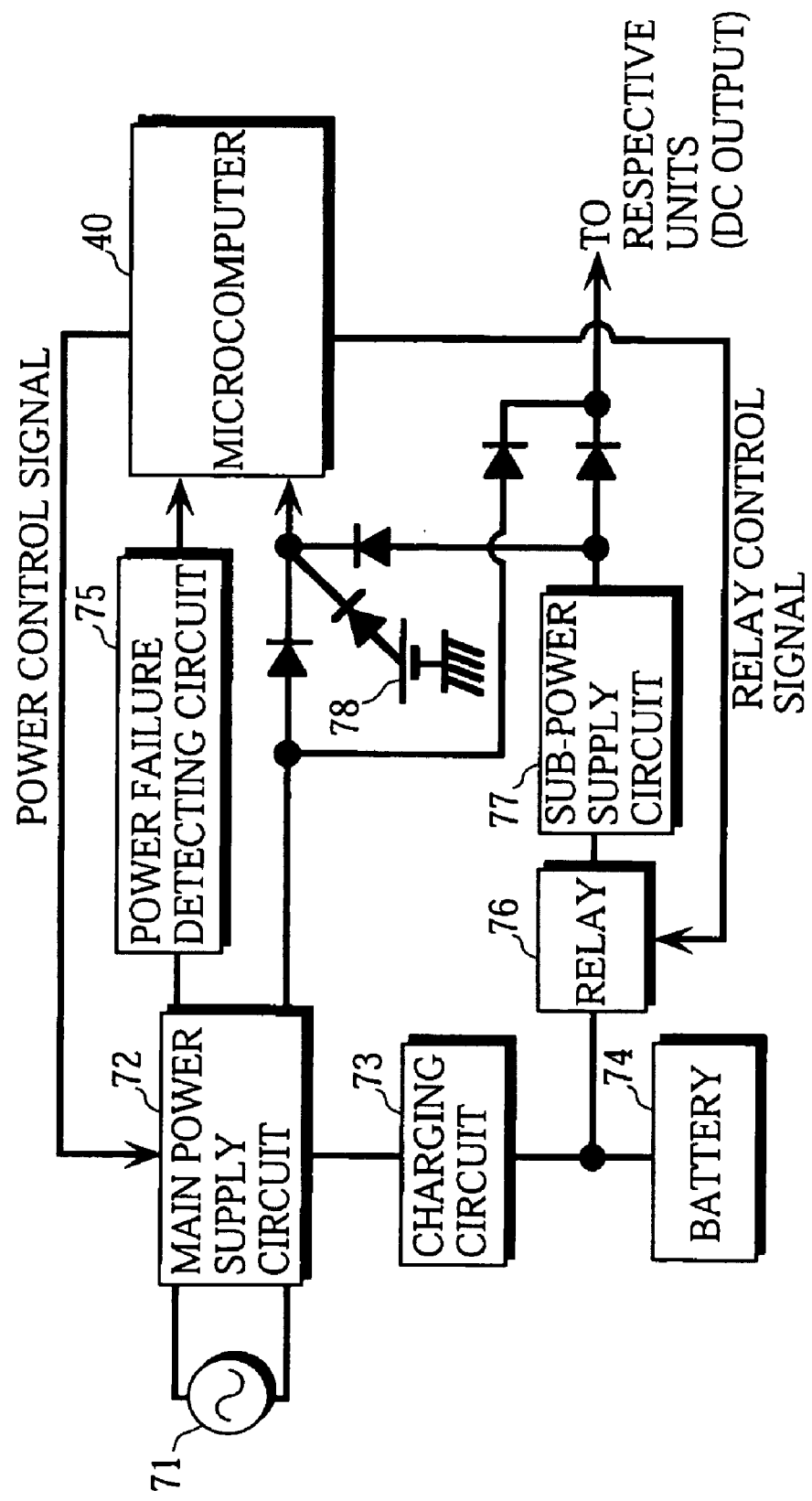
FIG. 11 is a circuit diagram showing the configuration of a power supply circuit for realizing a backup function in case of power failure.

FIG. 11 illustrates a driving circuit for realizing a backup function in case of power failure.

The power (DC output) to each of the microcomputer 40 and other units in the digital VTR 102 is always generated by a main power supply circuit 72 connected to a commercial power supply 71. When power is turned off, the power is also supplied to the microcomputer 40 by a battery 78. A power failure detecting circuit 75 monitors an output from the main power supply circuit 72, and outputs a power failure detection signal to the microcomputer 40 when power fails.

A battery 74 is a backup power supply for supplying power for recording on the video tape the data stored in the memories 17 and 18 in a case where power fails and all data composing two blocks to which the data belong. The battery 74 is charged by a charging circuit 73 connected to the main power supply circuit 72 when the power to the digital VTR is turned on.

The battery 74 is connected to a sub-power supply circuit 77 through a relay 76. The relay 76 is always in a non-operating state (an off state), while being brought into an operating state (an on state) by the microcomputer 40 when power fails.

As shown in FIG. 12, when power fails at the time point t1 while the recording operation is being performed, a power failure detection signal enters an L level. Accordingly, a relay control signal outputted from the microcomputer 40 enters an H level, so that the relay 76 is operated. Consequently, the power is supplied to the sub-power supply circuit 77 from the battery 74 through the relay 76, so that the power (DC output) is supplied to the microcomputer 40 and the other units in the digital VRT 102 by the sub-power supply circuit 77. As a result, the recording operation is continued.

When the data stored in the memories 17 and 18 in a case where power fails and all the data composing the two blocks to which the data belong have been recorded on the video tape (a time point t2), the relay control signal is brought into an L level by the microcomputer 40, so that the relay 76 is turned off.

In the example shown in FIG. 10, when power fails at the time point t1, the relay control signal is brought into an H level by the microcomputer 40, so that the relay 76 is operated. Consequently, the power is supplied to the sub-power supply circuit 77 from the battery 74 through the relay 76, so that the power is supplied to the microcomputer 40 and the other units in the digital VTR 102 by the sub-power supply circuit 77.

As a result, recording processing of the data corresponding to block0 which are stored in the memory 17 on the video tape is continued, and writing processing of the data corresponding to block1 into the memory 18 is continued. When the writing of the data corresponding to block1 into the memory 18 is terminated, recording processing of the data corresponding to block1 which have been stored in the memory 18 into the video tape is started. When the recording processing of the data corresponding to block1 on the video tape is terminated, the relay control signal is brought into an L level by the microcomputer 40, so that the relay 76 is turned off.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A backup device in case of power failure in an image recording apparatus for alternately writing input image data or its compressed data in two memories for each block including data corresponding to a plurality of fields, reading out, every time data corresponding to one block are written into the memory, the data from the memory into which the data corresponding to one block have been written, and recording the data read out on a recording medium, comprising:

a backup power supply in case of power failure;

a power failure detecting circuit for detecting that power fails;

a power supply circuit connected to the backup power supply through switching means and supplying power to a portion required to continue at least a recording operation on the basis of the backup power supply;

means for continuing, when the power failure is detected by the power failure detecting circuit during the recording operation, the recording operation by turning the switching means on; and means for turning the switching means off when the data which have been stored in both the memories immediately before power fails and all the data composing the two blocks to which the data belong have been recorded on the recording medium, to stop the recording operation.

2. The backup device in case of power failure according to claim 1, wherein the backup power supply in a battery, further comprising a charging circuit for charging the battery on the basis of a commercial power supply when the power to the image recording apparatus is turned on.

* * * * *